US 12,356,890 B1

(12) United States Patent
Frederick, Jr.

(10) Patent No.: US 12,356,890 B1
(45) Date of Patent: Jul. 15, 2025

(54) MOWER ATTACHED WEED TRIMMER

(71) Applicant: Craig Frederick, Jr., Springfield, OH (US)

(72) Inventor: Craig Frederick, Jr., Springfield, OH (US)

(*) Notice: Subject to any disclaimer, the term of this patent is extended or adjusted under 35 U.S.C. 154(b) by 606 days.

(21) Appl. No.: 17/724,697

(22) Filed: Apr. 20, 2022

(51) Int. Cl.
*A01D 43/16* (2006.01)

(52) U.S. Cl.
CPC .................... *A01D 43/16* (2013.01)

(58) Field of Classification Search
CPC ...................................... A01D 43/16
See application file for complete search history.

(56) References Cited

U.S. PATENT DOCUMENTS

| | | | | |
|---|---|---|---|---|
| 4,642,976 A * | 2/1987 | Owens | ................... | A01D 43/16 56/11.8 |
| 4,949,536 A * | 8/1990 | Neufeld | ................. | A01D 43/16 56/16.9 |
| 5,065,566 A | 11/1991 | Gates | | |
| 5,167,108 A | 12/1992 | Bird | | |
| 5,515,023 A * | 5/1996 | Marach | ................ | H01H 85/547 361/833 |
| 6,986,238 B1 * | 1/2006 | Bloodworth | ........... | A01D 34/84 56/17.6 |
| 7,690,177 B2 | 4/2010 | Spitzley | | |
| 8,783,005 B1 * | 7/2014 | Bernard | ................. | A01D 34/84 56/13.7 |
| 8,973,343 B2 | 3/2015 | Bell | | |
| 9,820,435 B2 | 11/2017 | Hofmeister | | |
| 9,872,432 B1 | 1/2018 | Millikan | | |
| 10,299,432 B1 * | 5/2019 | Kelly | ................... | A01D 34/824 |
| 10,772,259 B2 | 9/2020 | Parker et al. | | |
| 11,470,778 B2 * | 10/2022 | Carey | ................ | A01D 34/4165 |
| 2003/0093983 A1 * | 5/2003 | Savard | ................... | A01D 43/16 56/12.7 |
| 2007/0193240 A1 * | 8/2007 | Nafziger | .............. | A01D 34/416 56/13.7 |
| 2010/0000192 A1 * | 1/2010 | Robison | ................. | A01D 34/84 56/10.2 R |
| 2010/0326031 A1 * | 12/2010 | Branden | ................ | A01D 43/16 56/12.7 |
| 2015/0107118 A1 * | 4/2015 | Banjo | ................ | A01D 34/4166 29/401.1 |
| 2018/0027731 A1 * | 2/2018 | Self | ........................ | A01D 34/68 |
| 2018/0077861 A1 * | 3/2018 | Lego | ................... | A01D 34/4165 |
| 2018/0317396 A1 * | 11/2018 | Bukowski | .............. | A01D 34/84 |
| 2019/0053428 A1 * | 2/2019 | Parker | ..................... | F16M 11/10 |
| 2020/0337229 A1 * | 10/2020 | Hixson | .................. | A01D 43/16 |

(Continued)

*Primary Examiner* — Abigail A Risic
(74) *Attorney, Agent, or Firm* — Cramer Patent & Design, PLLC.; Aaron R. Cramer

(57) ABSTRACT

The mower attached weed trimmer is a device that attaches to a zero turning radius riding lawnmower and performs the function of a grass trimmer or "weed-eater." The device attaches to the mower deck through the use of a support mounting bracket that is bolted to the deck of the mower. A mounting arm is attached to the mounting bracket with the use of fasteners. The arm supports a line trimmer at the proper height and allows it to swing in an arc-shaped path next to the mower deck. The trimmer is powered by a motor directly from the battery of the mower and is controlled by a pushbutton switch on one handle of the zero-turn mower.

2 Claims, 5 Drawing Sheets

(56) References Cited

U.S. PATENT DOCUMENTS

| | | |
|---|---|---|
| 2021/0135489 A1* | 5/2021 | Stites-Clayton .. H02J 13/00004 |
| 2022/0142047 A1* | 5/2022 | Gotcher ................. A01D 69/02 |
| 2022/0287230 A1* | 9/2022 | Halik ..................... A01D 69/02 |
| 2022/0304224 A1* | 9/2022 | Coogan .............. A01D 34/4165 |
| 2024/0180076 A1* | 6/2024 | Sparrow ................ A01D 43/16 |

* cited by examiner

MOWER ATTACHED WEED TRIMMER

RELATED APPLICATIONS

None.

FIELD OF THE INVENTION

The presently disclosed subject matter is directed to a weed trimer and more specifically to a weed trimer that is attachable to a lawnmower.

BACKGROUND OF THE INVENTION

Many people spend countless hours maintaining and beautifying their lawns and landscape. As a matter of pride and personal expression, these people manicure their grass, plant and maintain flowers, shrubs, bushes and trees all for the sake of enhancing the aesthetic qualities of their property. On properties with large areas of grass to cut, zero turning radius riding mowers are very popular. They allow their users to cut relatively large areas of grass in a minimal amount of time while allowing the rider to sit in comfort.

However, these mowers, due to their size are not very adept at cutting close to objects such as fences, buildings, trees and the like. This usually requires the user to go back afterwards with a string type trimmer thus removing the benefits of being able to sit down and save time that the riding mower provided. Accordingly, there exists a need for a means by which grass trimming duties can be accomplished at the same time grass is being cut by a conventional zero turning radius riding mower. The development of the mower attached weed trimmer fulfills this need.

SUMMARY OF THE INVENTION

The principles of the present invention provide for a vegetation trimming device that has a trimming motor mounted at an end of an extendable pivot rod which is adapted to be mechanically coupled to a mower deck of a zero-turn mower, a power switch adapted to connect to one of a plurality of control arms of the zero-turn mower that allows for energization of the trimming motor, a trimmer head disposed on a distal end of the trimming motor, the trimmer head includes a cutting means, a section of wiring routed down one of the control arms and held in place by a plurality of retaining means, an additional section of wiring connecting the trimming motor held in place by a plurality of additional retaining means, and a battery from the zero-turn mower generates a plurality of electrical power that is routed to an overcurrent protective device.

A main mounting block may be adapted to be mechanically attached to the mower deck of the zero-turn mower and provides structural support for the extendable pivot rod. The extendable pivot rod may be positioned in the main mounting block such that the trimming motor is located close to the mower deck. The extendable pivot rod may be positioned in the main mounting block such that the trimming motor is located a distance away from the mower deck along an extension travel path when a plurality of trimming vegetation is located a distance away from the mower deck. The main mounting block and an adjustable clamping means may allow for manipulation of the trimming motor and the extendable pivot rod along a pivot travel path to provide additional flexibility in accessing hard to reach vegetation areas with the trimming motor. The adjustable clamping means may secure the extendable pivot rod. The adjustable clamping means may be a threaded knob. The power switch may be located within a switch enclosure. The switch enclosure may be positioned for the power switch to be easily adapted to be activated and deactivated by a user of the zero-turn mower. A plurality of resultant power from the overcurrent protective device may be routed along the section of wiring that is sent to the power switch where it is controlled by the user. The switch enclosure may be made of heavy duty impact resistant plastic. The power switch may be adapted to connect to one of the control arms of the zero-turn mower.

The cutting means may be a trimmer string. The cutting means may be a plurality of blades. The retaining means may be a plurality of nylon tie-wraps. The additional retaining means may be a plurality of nylon tie-wraps. The section of wiring may be secured via the retaining means while providing a cable loop to allow of the trimming motor and the extendable pivot rod in relation to the mower deck. The overcurrent protective device may be a fuse to prevent one or more overcurrent events. The controlled power may be sent to the trimming motor via the additional section of wiring.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
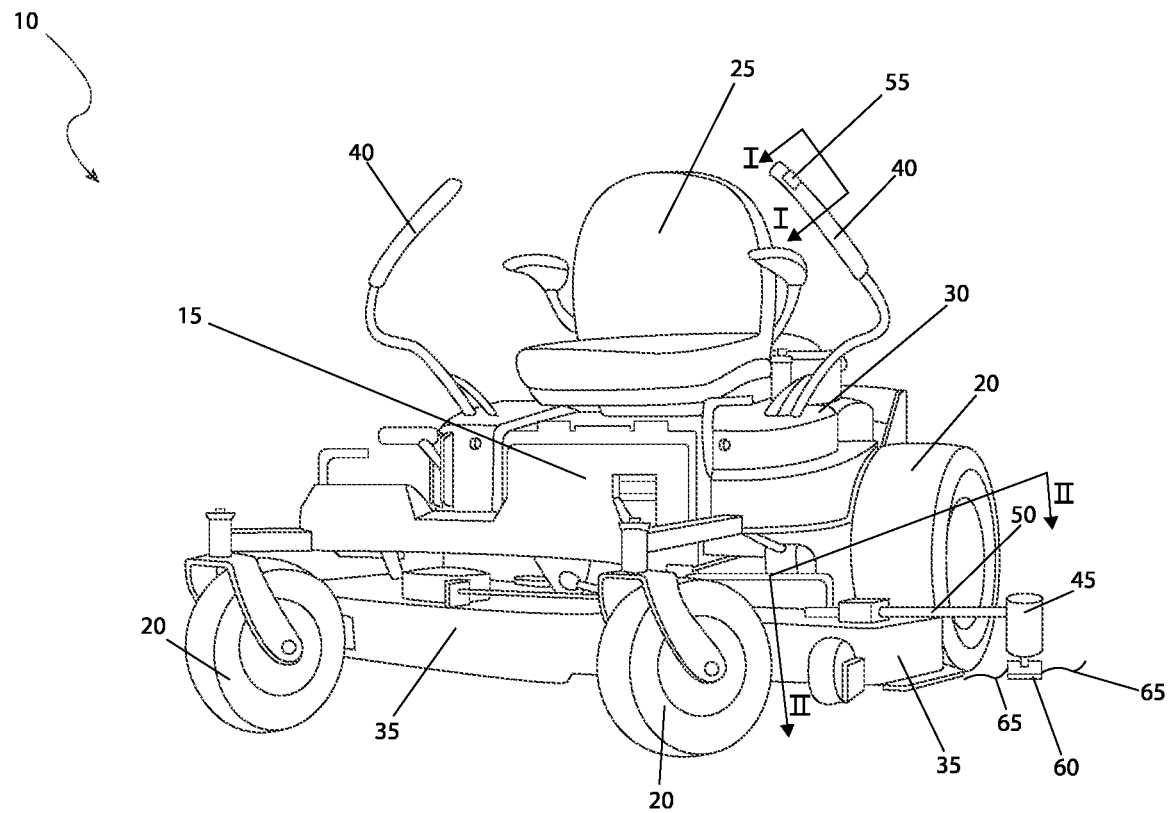
FIG. 1 is a perspective front view of the vegetation trimming device, installed upon a zero-turn mower, according to the preferred embodiment of the present invention.

DESCRIPTIVE KEY 10 vegetation trimming device
15 zero-turn mower
20 wheel
25 seat
30 engine
35 mower deck
40 control arm
45 trimming motor
50 extendable pivot rod
55 power switch
60 trimmer head
65 cutting means
70 switch enclosure
75 wiring
80 retaining means
85 main mounting block 90 adjustable clamping means
95 extension travel path "e"
100 pivot travel path "p"
105 cable loop
110 battery
115 overcurrent protective device

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective front view of a vegetation trimming device 10 installed upon a zero-turn mower 15, according to the preferred embodiment of the present invention is disclosed. The vegetation trimming device (herein also described as the "device") 10, attaches to a zero-turning radius riding lawnmower 15 and performs an additional function as a grass trimmer. The zero-turn mower 15 is an otherwise conventional machine and is equipped with wheels 20, a seat 25, an engine 30, a mower deck 35 and two (2) control arms 40. A trimming motor 45 is mounted at the end of an extendable pivot rod 50 which is in turn mechanically coupled to the mower deck 35. Further description of the mechanical connection will be provided herein below. A power switch 55 is connected to one (1) of the control arms 40 and allows for energization of the trimming motor 45. It is noted that the power switch 55 is connected to a first control arm 40 (herein depicted as the "left"), however the power switch 55 may also be placed on the second ("right") control arm 40. As such, the placement of the power switch 55 is not intended to be a limiting factor of the present invention. The trimming motor 45 is provided with a trimmer head 60 that provides for a cutting means 65 such as trimmer string, blades, or the like. The exact method of vegetation cutting provided by the cutting means 65 is not intended to be a limiting factor of the present invention.

Figure 2:
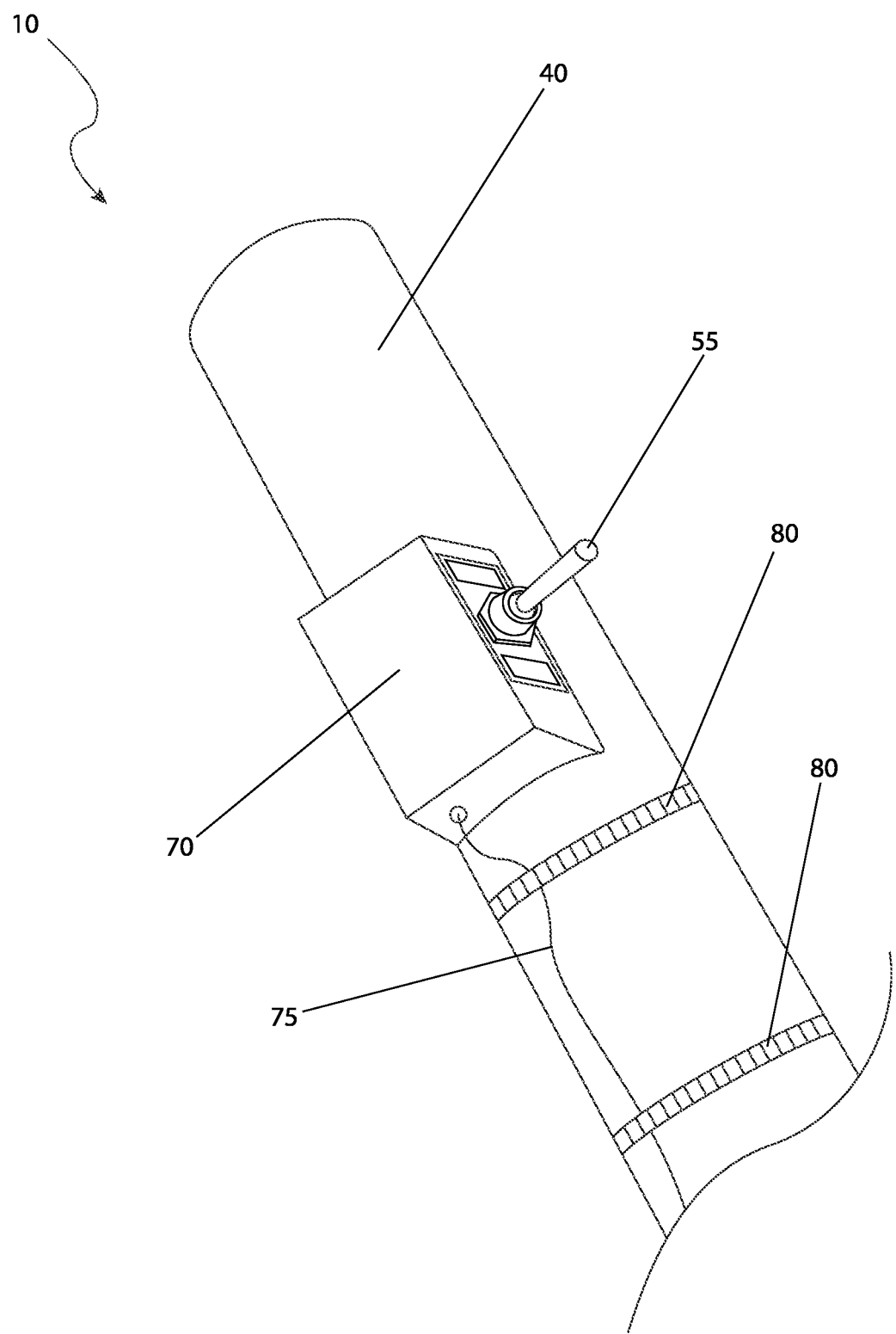
FIG. 2 is a sectional view of the vegetation trimming device, as seen along a Line I-I, as shown in FIG. 1, according to the preferred embodiment of the present invention.

Referring next to FIG. 2, a sectional view of the device 10, as seen along a Line I-I, as shown in FIG. 1, according to the preferred embodiment of the present invention is depicted. The power switch 55 is located within a switch enclosure 70 and is attached to either control arm 40 as aforementioned described. The switch enclosure 70 provides positioning for the power switch 55 such that it may be easily activated and deactivated by the user of the zero-turn mower 15 (a shown in FIG. 1). The switch enclosure 70 is envisioned to be manufactured from heavy duty impact resistant plastic. A section of wiring 75 is routed down the control arm 40 to the remaining electrical components of the device 10, as will be shown in greater detail herein below. The wiring 75 is held in place by multiple retaining means 80 such as nylon tie-wraps.

Figure 3:
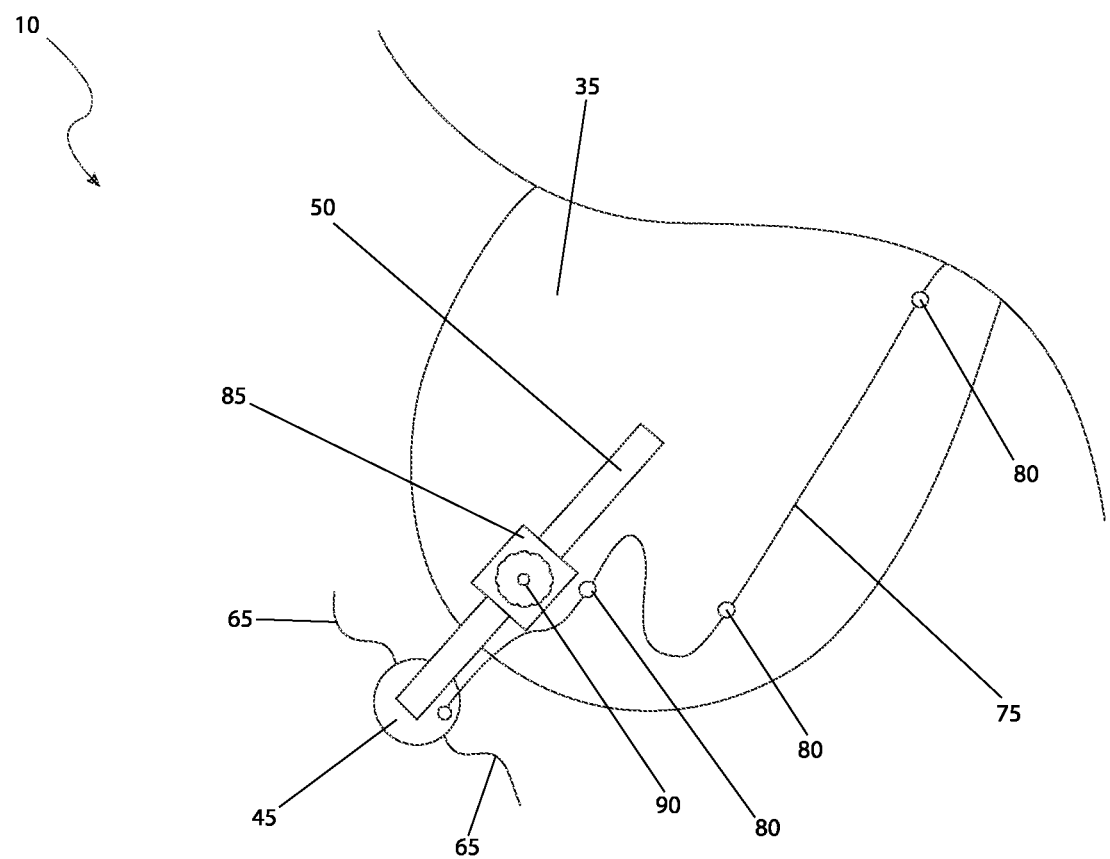
FIG. 3 is a sectional view of the vegetation trimming device, as seen along a Line II-II, as shown in FIG. 1, in a retracted state, according to the preferred embodiment of the present invention.

Referring now to FIG. 3, a sectional view of the device 10, as seen along a Line II-II, as shown in FIG. 1, in a retracted state, according to the preferred embodiment of the present invention is shown. The mower deck 35 serves as the base for holding the trimming motor 45 and associated components. A main mounting block 85 is mechanically attached to the mower deck 35 and provides structural support for the extendable pivot rod 50. In this view of FIG. 3, the extendable pivot rod 50 is positioned in the main mounting block 85 such that the trimming motor 45 is located close to the mower deck 35. Such a position is ideal for trimming vegetation along a fence or similar location where the zero-turn mower 15 (as shown in FIG. 1) may be close, but trimming is still necessary. An adjustable clamping means 90, such as a threaded knob, provides securement for the extendable pivot rod 50. The use of any particular type of adjustable clamping means 90 is not intended to be a limiting factor of the present invention. Further detail on the positioning abilities afforded by the main mounting block 85 and the adjustable clamping means 90 will be provided herein below. Finally, additional section of wiring 75 are used to connect the trimming motor 45 to the remaining electrical components of the device 10 as will be described in greater detail herein below. The wiring 75 is held in place via additional retaining means 80.

Figure 4:
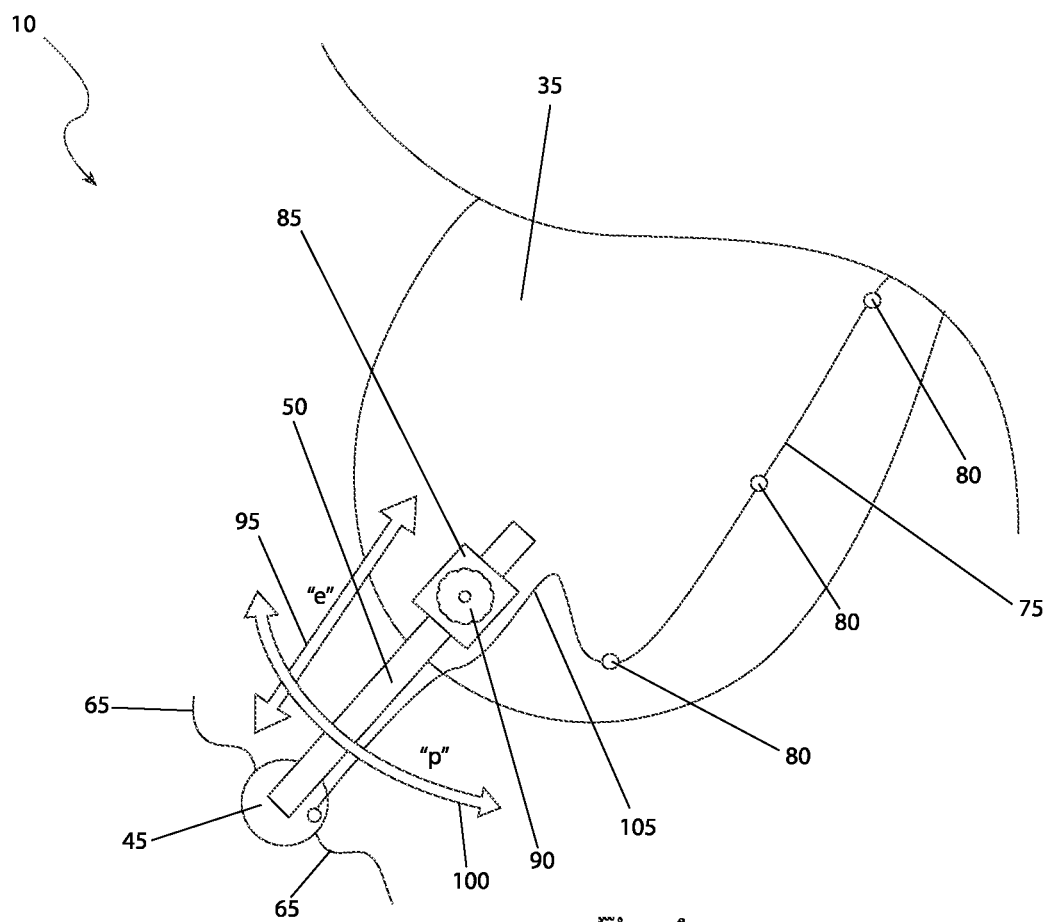
FIG. 4 is a sectional view of the vegetation trimming device, as seen along a Line II-II, as shown in FIG. 1, in an extended state, according to the preferred embodiment of the present invention.

Referring next to FIG. 4, a sectional view of the device 10, as seen along a Line II-II, as shown in FIG. 1, in an extended state, according to the preferred embodiment of the present invention is disclosed. In this view of FIG. 4, the extendable pivot rod 50 is positioned in the main mounting block 85 such that the trimming motor 45 is located a distance away from the mower deck 35 along an extension travel path "e" 95. This configuration is ideal when trimming vegetation located a distance away from the mower deck 35 such as along flowerbeds, mailbox posts, or similar locations where the zero-turn mower 15 (as shown in FIG. 1) cannot closely approach. Additionally, the main mounting block 85 and adjustable clamping means 90 allows for manipulation of the trimming motor 45 and the extendable pivot rod 50 along a pivot travel path "p" 100 to provide additional flexibility in accessing hard to reach vegetation areas with the trimming motor 45. As before, the wiring 75 is secured via the retaining means 80 while providing a cable loop 105 to allow for movement of the trimming motor 45 and the extendable pivot rod 50 in relation to the mower deck 35.

Figure 5:
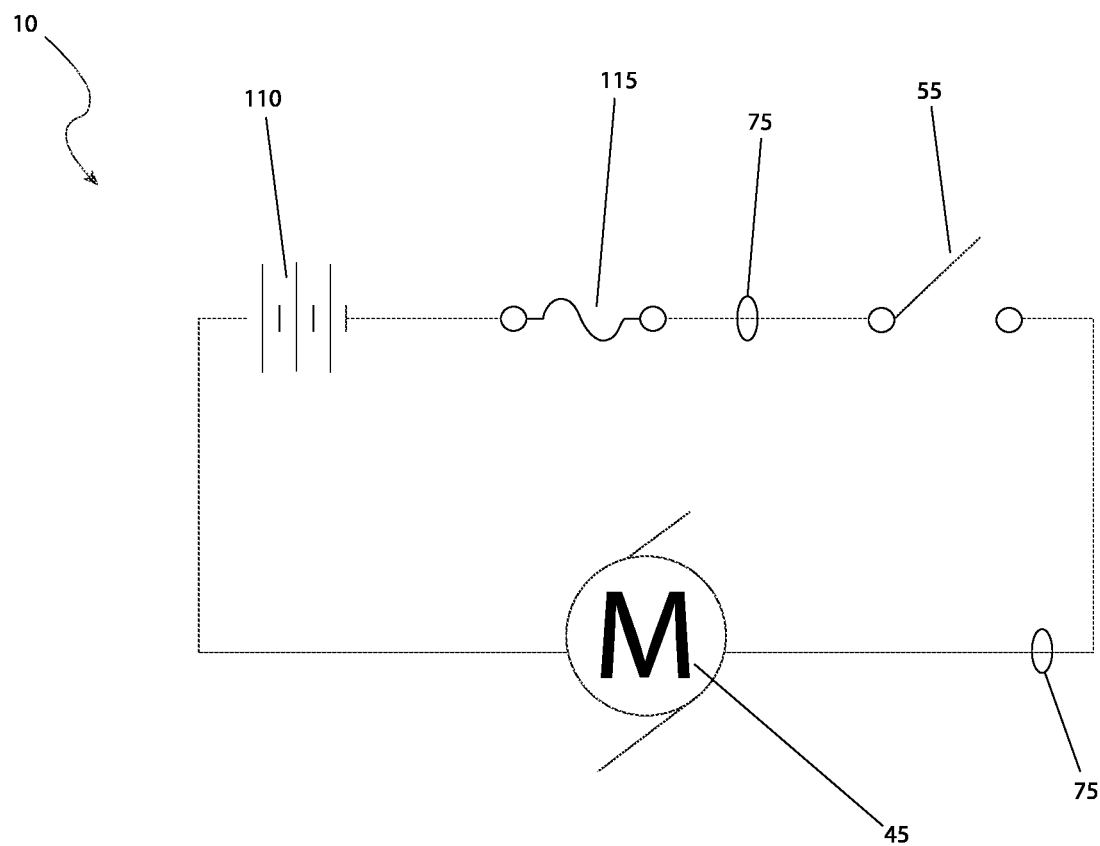
FIG. 5 is an electrical block diagram of the vegetation trimming device, according to the preferred embodiment of the present invention.

Referring to FIG. 5, an electrical block diagram of the device 10, according to the preferred embodiment of the present invention is depicted. A battery 110, typically provided as a factory component of the zero-turn mower 15 (as shown in FIG. 1) provides electrical power for the device 10. Power from the battery 110 is routed to an overcurrent protective device 115, herein shown as a fuse to prevent the occurrence of overcurrent events such as short circuits, defective trimming motor 45 and the like. Resultant power from the overcurrent protective device 115, routed along the wiring 75 is sent to the power switch 55 where it is controlled by the user. The controlled power is then finally sent to the trimming motor 45 via another section of wiring 75. It is noted that all of the electrical components are wired in a series connection.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as lawn and garden equipment supply stores, home improvement stores, mechanical supply houses, mail order and internet supply houses and the like. It is envisioned that the device 10 would be provided as standard or optional equipment on a new zero-turn mower 15 as well as being made available as an add-on kit for existing zero-turn mower 15.

After procurement and prior to utilization, the device 10 would be installed for use on existing zero-turn mower 15 in the following manner: the main mounting block 85 would be installed on the mower deck 35, the extendable pivot rod 50 would be installed on the main mounting block 85, and the trimming motor 45 installed on the distal end of the extendable pivot rod 50. The power switch 55 would be installed on a control arm 40 inside of the switch enclosure 70. The wiring 75 would be routed between the various electrical components as shown in FIG. 5. Any retaining means 80 would then be installed to retain any loose wiring 75. At this point in time, the device 10 is ready for use.

During utilization of the device 10, the following procedure would be initiated the user of the zero-turn mower 15 would cut the lawn in a typical and transparent manner. When approaching an area requiring close up trimming of vegetation of which the zero-turn mower 15 is not capable of performing, the user would activate the trimming motor 45 using the power switch 55. The zero-turn mower 15 is then maneuvered such that the cutting means 65 of the trimmer head 60 may cut the vegetation. Should additional optimization of the trimmer head 60 be required in order to reach vegetation that the zero-turn mower 15 is not capable of providing, the adjustable clamping means 90 is loosened allowing the trimming motor 45 to be adjusted along the extension travel path "e" 95 and/or the pivot travel path "p" 100. At the end of the trimming cycle with the device 10, the power switch 55 is deactivated until needed again in a cyclical and repeating manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vegetation trimming device, comprising:
   a trimming motor mounted at an end of an extendable pivot rod;
   a main mounting block adapted to be mechanically attached to a mower deck of the zero-turn mower, the main mounting block providing structural support for the extendable pivot rod;
   a power switch housed within a switch enclosure and positioned on a control arm of the zero-turn mower;
   an overcurrent protective device electrically connected to a battery of the zero-turn mower, wherein power from the battery is routed through the overcurrent protective device to the power switch and then to the trimming motor;
   a section of wiring secured along the control arm using a plurality of retaining means, the section of wiring connecting the power switch to the overcurrent protective device;
   an additional section of wiring secured using additional retaining means, the additional section of wiring connecting the power switch to the trimming motor; and,
   wherein the extendable pivot rod is configured to move along an extension travel path to position the trimming motor at varying distances from the mower deck, and
   wherein the main mounting block includes an adjustable clamping means to secure the extendable pivot rod at a desired position along the extension travel path.

2. The vegetation trimming device of claim 1, wherein:
   the trimming motor includes a trimmer head at its distal end, the trimmer head having a cutting means selected from at least one of a trimmer string or a plurality of blades;
   the adjustable clamping means of the main mounting block allows the extendable pivot rod to pivot along a pivot travel path in addition to the extension travel path; and
   the switch enclosure is made from heavy-duty impact-resistant plastic.

* * * * *